Patented Mar. 19, 1940

2,194,370

UNITED STATES PATENT OFFICE 2,194,370

STABILIZATION OF LIQUID HYDRO-CYANIC ACID

Mark Walker, deceased, late of South Pasadena, Calif., by Alice F. Walker, executrix, South Pasadena, Calif., assignor to E. I. du Pont de Nemours & Company, Wilmington, Del., a corporation of Delaware No Drawing. Application December 27, 1938, Serial No. 247,844

7 Claims. (Cl. 23—250)

This invention relates to the stabilization of liquid hydrocyanic acid against decomposition, polymerization, or both.

Liquid hydrocyanic acid is a water-white liquid boiling at about 25.65° C. at atmospheric pressure. When stored without treatment it tends to polymerize and decompose so that within a few days it develops a noticeable color which progresses from a light yellow to a dark opaque brown. Polymerization and decomposition generally occur simultaneously. If the polymerizing action is great the liquid product is frequently converted into a solid mass. The decomposition reaction is exothermic, so that when once started it accelerates rapidly unless the rate of heat radiation exceeds the rate of generation. Heat radiation from containers is usually at a low rate so that internal pressures sufficient to burst the container are frequently developed within short periods of time. Hence, unless properly stabilized, particularly against decomposition, the storing and handling of liquid hydrocyanic acid involves serious hazards.

It has been considered heretofore that decomposition and polymerization are promoted or catalyzed by alkalies, including basic nitrogen compounds thought to be formed slowly in the liquid. In view of this, acids have been proposed as suitable stabilizers and acids such as sulfuric, oxalic, formic and acetic acids, have been used with some success for this purpose. Substances such as the halides of antimony, aluminum, tin and lead, as well as alkyl chlorides and sulphates, which substances are capable of splitting off acid by hydrolysis, have also been suggested as suitable stabilizers. The above suggestions have been in accordance with the generally accepted view that stabilization requires merely the neutralization of alkaline materials and that all acids or substances capable of forming acids are substantially equivalent with each other for this purpose.

It has now been discovered that all acids are not equivalent in their stabilizing effect upon liquid hydrocyanic acid and that certain acids are markedly superior to other acids such as sulfuric, oxalic, formic and acetic acids, which have been used heretofore with results which were far from being entirely satisfactory. Accordingly, it is one object of this invention to provide an improved acid stabilizer for liquid hydrocyanic acid. A further object is to provide liquid hydrocyanic acid having a high degree of stability against decomposition and/or polymerization and capable of being stored for extended periods of time without danger of spontaneous and hazardous decomposition occurring. These and other objects will be apparent from the ensuing description of the invention.

The above objects may be accomplished in accordance with the present invention by adding stabilizing amounts of phosphorus pentoxide or phosphoric acid, including, ortho-, meta- and pyrophosphoric acids, to liquid hydrocyanic acid. Amounts of these substances within the range of 0.001 to 0.5%, and preferably 0.005 to 0.2%, by weight of the hydrocyanic acid, are especially effective, although other amounts may be used with good results. Any commercial grade of phosphoric acid containing about 85% by weight of phosphoric acid, $H_3PO_4$, is preferred because it is readily available and is more convenient to handle than is, for example, phosphorus pentoxide. However, the other substances set forth above may be used with excellent results in accordance with the present invention.

As the result of long practical experience in the handling and stabilizing of liquid hydrocyanic acid and of numerous experimental tests carried out to determine the stabilizing effectiveness of a wide variety and number of substances, it has now been discovered that phosphoric acid is highly effective in preventing decomposition and/or polymerization of liquid hydrocyanic acid, being markedly superior for this purpose to other known substances such as sulfuric acid, oxalic acid and the like. Liquid hydrocyanic acid stabilized in accordance with the present invention has been stored successfully in containers made of various types of construction material for as long as 8 to 12 years without excessive decomposition or polymerization occurring even at temperatures as high as 50° C. These results are indeed remarkable, in that but a relatively small amount of the stabilizer is required. For example, in one test carried out in sealed "Pyrex" glass tubes liquid hydrocyanic acid containing only 0.005% by weight of 85% phosphoric acid was still stable and water-white in appearance after 12 years at ordinary temperature.

The following examples are illustrative of the remarkable effectiveness of phosphoric acid as a stabilizer for liquid hydrocyanic acid.

Example 1

The series of stability tests described in this example were carried out in sealed glass tubes constructed of a high silica glass sold commercially under the trade name "Pyrex." Approximately 10 cubic centimeters of liquid hydrocyanic acid stabilized with 0.005% by weight of one of the various acids being tested were contained in each tube. The acids used as stabilizers, all being of the usual C. P. grade, were 96% sulfuric acid, anhydrous oxalic acid, 85% formic acid, 85% phosphoric acid, and 36 to 37.5% hydrochloric acid. Two series of samples were prepared, one being stored at ordinary temperature and the other at a constant temperature of 50° C. All tubes were observed at daily intervals during the early part of the tests, after which they were observed at monthly periods for a time, followed by observations at periods of longer duration as the time of the tests extended. In all of the tests, a sample was considered to have become unstable and was discarded after a pronounced yellow color had developed, or the container had burst due to the development of pressure therein.

The following table shows the life periods of all samples. Where the record of time of failure of a sample was not clear, the life period is indicated as less than (—) the maximum possible life as shown by the records. Samples that were still water-white at the end of 12 years are indicated as having a life greater than (+) 12 years.

| Stabilizer added | Life at— | |
|---|---|---|
| | Ordinary temperature | 50° C. |
| Sulfuric acid, 0.005% by weight | 7.5 months | 1 day. |
| Oxalic acid, 0.005% by weight | 2.5 years | 4.5 months. |
| Phosphoric acid, 0.005 by weight | +12 years | —3.5 years. |
| Formic acid, 0.005 by weight | 9 days | 4 days. |
| Hydrochloric acid, 0.005% by weight | | 60 days. |
| None | 6 days | 2 days. |

*Example 2*

The tests described in this example were carried out in steel containers capable of holding about 40 lbs. of liquid hydrocyanic acid when half full. The steel cylinders were provided with 1 inch brass fittings, including a gate valve for use during sampling, and a length of pipe extending through a hole in the top of a constant temperature box to a pair of gasket flanges between which was bolted a disc of cloth impregnated with a synthetic resin and having a bursting pressure of about 100 lbs. gage. Prior to use the cylinders were pickled with dilute acid, washed with water and then drained. The hydrocyanic acid used in the tests was taken from regular plant production and was of the usual commercial purity, containing about 96 to 96.5% of hydrocyanic acid. Approximately 40 lbs. of hydrocyanic acid were used in each test. During the pendency of the tests the constant temperature box was maintained at a temperature of 50° C., ±5° C.

The steel cylinders were charged with about 40 lbs. of liquid hydrocyanic acid containing 0.1% by weight of sulfuric, formic, oxalic, or acetic acid, or with 0.05% of phosphoric acid. Portions of each sample were withdrawn at monthly intervals for observation of the color developed. The tests were discontinued when the yellow color developed matched in intensity the color of a solution prepared by diluting with an equal volume of distilled water a solution containing 0.01 mols of cobaltous chromate, $CoCrO_4$, and 15 grams of cobaltous chloride, $CoCl_2.6H_2O$, per liter of dilute sulfuric acid. The dilute sulfuric acid was prepared by diluting one volume of concentrated C. P. sulfuric acid with three volumes of water. The color comparisons were made in matched Nessler tubes according to the usual procedure.

The results of these tests are shown in the following table:

| Stabilizer | Life in months at 50° C. (duplicate samples) |
|---|---|
| Sulfuric acid, 0.1% by weight | 10 and 12 |
| Formic acid, 0.1% by weight | 3 and 4 |
| Oxalic acid, 0.1% by weight | 18 and 21 |
| Acetic acid, 0.1% by weight | 6 and 6 |
| Phosphoric acid, 0.05% by weight | More than 33 |
| None | 4 and 5 |

In another test anhydrous liquid hydrocyanic acid to which had been added approximately 0.25% by weight of phosphorous pentoxide remained stable for 8¼ years when stored in tin capsules at 50° C. Product similarly stabilized and stored in copper capsules at 50° C. was still stable after 11½ years, at which time the test was discontinued. In these particular tests the development of color was not relied upon as a measure of stability, since the test capsules were never opened during the pendency of the tests. A sample was considered to be stable so long as the metal capsule had not burst, due to pressure developed within the capsule, and so long as its contents remained liquid.

It is clear from the results of Examples 1 and 2 above that phosphoric acid is markedly more effective than are other acids such as sulfuric, oxalic, formic and hydrochloric acids. Although no satisfactory scientific explanation of this fact is apparent, it is believed that phosphoric acid possesses some specific property not possessed by the above other acids, and aside from its ability to neutralize alkaline substances, which property, in part at least, is responsible for its superior stabilizing value, but whatever be the explanation, it has been discovered and demonstrated by means of numerous tests extending over a period of many years that phosphoric acid is a markedly superior stabilizer, and the present invention is based upon this discovery.

The relative stabilizing value of a material used with liquid hydrocyanic acid depends considerably upon the container in which the stabilized product is stored. Thus, while both phosphoric acid and phosphorus pentoxide are effective stabilizers for product stored in containers constructed of various materials such as "Pyrex" glass, copper, tin and steel, they are not equally effective in all types of containers. For example, results of numerous tests have shown that phosphoric acid is appreciably more effective in steel or "Pyrex" glass containers than in tin containers, and phosphorus pentoxide is appreciably more effective in copper containers than in tin or "Pyrex" glass containers. Accordingly, it is preferred to practice the present invention by employing as stabilizer phosphoric acid when the stabilized product is to be stored either in steel or "Pyrex" glass containers and by using phosphorus pentoxide when the product is to be stored in copper containers.

This invention provides a very effective and practical method of stabilizing liquid hydrocyanic acid during extended periods of time. In accordance therewith liquid hydrocyanic acid may be stored and handled in various types of containers without danger of spontaneous and hazardous decomposition occurring and with assurance that undesirable polymerization will not occur. So far as is known, no such effective manner of accomplishing these results has been practiced commercially heretofore.

In the appended claims the term "phosphoric acid" is used to include meta- and pyrophosphoric acids as well as the usual orthophosphoric acid.

Various modifications of the present invention may be practiced without departing from the scope and spirit thereof. It is to be understood that the invention is not to be limited by the details, examples and procedural steps set forth above, which are intended to be illustrative and not restrictive of the invention, but only by the scope of the appended claims.

What is claimed is:

1. A new composition of matter comprising liquid hydrocyanic acid and a small amount of a substance selected from the group consisting of phosphoric acid and phosphorus pentoxide sufficient to prevent polymerization and decomposition of said liquid hydrocyanic acid.

2. A new composition of matter comprising liquid hydrocyanic acid and a small amount of phosphoric acid sufficient to prevent polymerization and decomposition of said liquid hydrocyanic acid.

3. A new composition of matter comprising liquid hydrocyanic acid and 0.001 to 0.5% by weight of phosphoric acid.

4. A new composition of matter comprising liquid hydrocyanic acid and a small amount of phosphorus pentoxide sufficient to prevent polymerization and decomposition of said liquid hydrocyanic acid.

5. A package comprising a container and liquid hydrocyanic acid containing a small amount of a substance selected from the group consisting of phosphoric acid and phosphorus pentoxide sufficient to prevent polymerization and decomposition of said liquid hydrocyanic acid within said container.

6. A package comprising a steel container and liquid hydrocyanic acid containing a small amount of phosphoric acid sufficient to prevent polymerization and decomposition of said liquid hydrocyanic acid within said container.

7. A package comprising a steel container and liquid hydrocyanic acid containing 0.001 to 0.5% by weight of phosphoric acid within said container.

ALICE F. WALKER,
*Executrix of the Last Will and Testament of Mark Walker, Deceased.*